United States Patent Office 3,290,250
Patented Dec. 6, 1966

3,290,250
STABILIZATION OF ORGANIC MATERIAL WITH 2,2' - METHYLENEBIS(4 - HALO-6-TERT-BUTYL-PHENOL)
Harold D. Orloff, Oak Park, and John P. Napolitano, Royal Oak, Mich., assignors to Ethyl Corporation, New York, N.Y., a corporation of Virginia
No Drawing. Continuation of application Ser. No. 211,846, July 23, 1962, which is a division of application Ser. No. 45,784, July 28, 1960. This application Oct. 21, 1965, Ser. No. 500,183
10 Claims. (Cl. 252—54)

This application is a continuation of application Serial No. 211,846, filed July 23, 1962, now abandoned, which in turn is a division of application Serial No. 45,784, filed July 28, 1960, now U.S. Patent 3,146,273.

This invention relates to novel phenolic compounds containing a halogen substituent on the benzene ring, and more particularly to the use as antioxidants of methylenebis phenols which are halogen substituted.

It is an object of this invention to provide novel phenolic compounds having an extremely high degree of antioxidant and stabilizing activity in a wide variety of organic compositions. Another object of this invention is the provision of phenolic compounds which are outstanding antioxidants in organic media such as fuels, lubricants and polymeric material. A still further object is the provision of stabilized organic material containing a novel phenolic compound. Another object is to provide novel methods for the preparation of phenolic compounds. Other objects will become apparent by the following specification.

The objects of this invention are in part accomplished by a compound having the formula:

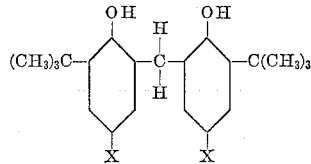

where X is a halogen selected from the class consisting of chlorine, bromine and iodine.

The most particularly preferred compound of this invention is 2,2'-methylenebis-(4-chloro-6-tert-butylphenol) which is both readily prepared and, as will be further illustrated below, is an outstanding antioxidant additive.

The compounds of this invention find important utility as antioxidants in a wide variety of oxygen sensitive materials. Thus, an embodiment of this invention is organic material normally tending to undergo oxidative deterioration in the presence of air, oxygen, or ozone, protected against such deterioration by the inclusion therein of a small antioxidant quantity, up to about 5 percent, of a 2,2'-methylenebis-(4-halo-6-tert-butylphenol) as defined above. As noted above, a particularly preferred embodiment of this invention is organic material containing the compound 2,2'-methylenebis-(4-chloro-6-tert-butylphenol).

Thus, liquid and solid products derived from petroleum crude are found to possess greatly increased storage stability by the use of an antioxidant of this invention. For example, gasoline jet fuel, kerosene, fuel oil, turbine oils, insulating oils, motor oils and various waxes have increased oxidative stability when they contain an antioxidant of this invention. Likewise, liquid hydrocarbon fuels which contain organometallic additives such as tetraethyllead and other organometallic compositions which are used as fuel additives attain appreciably increased oxidative stability by the practice of this invention. Furthermore, such fuels which contain halogen and phosphorus-containing scavengers for these organometallic compounds are benefited by the practice of this invention. In addition to increased storage stability, lubricating oils and functional fluids, such as automatic transmission and hydraulic fluids, both those derived from naturally occurring hydrocarbons and those synthetically prepared, achieve a high degree of resistance to oxidation during use at elevated temperatures by the practice of this invention. It has been found that lubricating oils may be employed at extremely high temperatures without undergoing oxidative degradation when protected by an antioxidant of this invention. The addition of small quantities of the compositions of this invention to such materials as hydraulic, transformer and other highly refined industrial oils, as well as crankcase lubricating oils and lubricating greases prepared from these oils by the addition of metallic soaps, greatly increase their resistance to deterioration in the presence of air, oxygen or ozone. Furthermore, the organic soaps used in the preparation of lubricating greases are themselves stabilized by the practice of this invention.

Organometallic compositions such as tetraethyllead and tetraethyllead antiknock fluids containing halohydrocarbon scavengers, dyes and which may contain various phosphorus compounds and other organometallic additives are stabilized against deterioration during storage by the addition thereto of an antioxidant quantity of the compositions of this invention.

The compositions of this invention are also extremely effective antioxidants for elastomers including high molecular weight unsaturated hydrocarbon polymers including both those derived from naturally occurring sources and those synthetically prepared. Thus, natural rubbers and synthetic rubbers, including oil extended rubbers and sulfur vulcanized rubbers are greatly benefited by the practice of this invention. Examples of the synthetic rubbers protected by the practice of this invention include such synthetics as polybutadiene, methyl rubber, polybutadiene rubber, butyl rubber, SB-R rubber, GR-N rubber, piperylene rubber and dimethylbutadiene rubber.

The practice of this invention is also useful in protecting paraffin and micro-crystalline petroleum waxes against the oxidative deterioration which leads to rancidity. Furthermore, the compositions of this invention are extremely useful in the stabilization of fats and oils of animal or vegetable origin which become rancid during periods of storage due to oxidative deterioration. Typical animal fats benefited by the practice of this invention include butter fat, lard, beef tallow, fish oils—such as cod liver oil—as well as various foods containing or prepared in animal fats which tend to deteriorate. These include, for example, potato chips, fried fish, donuts, crackers, and various types of pastry such as cakes and cookies. Furthermore, fat fortified animal feeds and fish meals used as animal feeds are greatly benefited by the practice of this invention. Not only are these compositions protected against oxidative deterioration but the inclusion of a composition of this invention in such materials inhibits the degradation of vitamins A, D and E and certain of the B complex vitamins. Examples of compositions containing oils derived from vegetable sources which are benefited by the practice of this invention include castor oil, soy bean oil, rapeseed oil, coconut oil, olive oil, palm oil, corn oil, sesame oil, peanut oil, babassu oil, citrus oils, cotton seed oil and various compositions containing these, including peanut butter, peanuts and other whole nuts, salad dressings, margarine and other vegetable shortenings.

The compositions of this invention are also outstanding antioxidants for various organic compounds and polymeric materials including polystyrene, polyvinylchloride, polyvinyl acetate, various epoxide resins, polyester resins and polymers, including alkyds, and polymers of monoolefins, such as polyethylene and polypropylene.

A preferred embodiment of this invention is rubber (including natural rubber, sulfur vulcanized rubber and synthetic rubber) normally susceptible to oxidative deterioration inhibited against such deterioration by a small antioxidant quantity, up to about 5 percent of a 2,2'-methylenebis-(4-halo - 6 - alkylphenol) compound as defined above.

Although concentrations of the 2,2'-methylenebis-(4-halo-6-alkylphenol) compounds of this invention, up to 5 percent, may be employed, the compounds are such effective stabilizers that concentration ranges of from 0.001 to about 2 percent by weight are usually sufficient to effectively stabilize the material to be protected (based on the weight of the material). The most preferred concentration range is from about 0.2 to about 1.5 percent by weight of the additive based on the weight of material to be protected. Deviations from these concentrations are acceptable and sometimes useful depending upon the initial degree of instability of the material being stabilized and the severity of conditions to which the finished product is to be subjected. Smaller amounts of the compounds may be employed when the material is to be used at lower temperature and oxidation in storage is the primary problem.

The synthetic lubricants which are enhanced by the practice of this invention are, in general, non-hydrocarbon organic compositions; i.e., organic compositions which contain elements other than carbon and hydrogen. Examples of general classes of material which are protected against oxidative deterioration by the inclusion therein of a 2,2'-methylenebis-(4-halo-6-tert-butylphenol) of this invention include diester lubricants, silicones, halogen containing organic compounds including the fluorocarbons; polyalkylene glycol lubricants, and organic phosphates which are suitable as hydraulic fluids and lubricants. Excellent results are obtained when a 2,2'-methylenebis-(4-halo-6-tert-butylphenol) is added to any member of these classes of materials; however, it has been found that exceptional oxidative stability is imparted to diester lubricants by the practice of this invention. Thus a synthetic diester lubricant containing from about 0.001 to about 2 percent by weight of 2,2'-methylenebis-(4-halo-6-tert-butylphenol) constitutes a preferred embodiment of this invention. The synthetic diester oils stabilized by the practice of this invention include sebacates, adipates, etc., which find particular use as aircraft instrument oils, hydraulic and damping fluids, and precision bearing lubricants. These diester oils are exceedingly difficult to stabilize under high temperature conditions. In this invention, use can be made of a wide variety of diester oils of the type described in Industrial and Engineering Chemistry, 39, 484–91 (1947). Thus, use can be made of the diesters formed by the esterification of straight chain dibasic acids containing from 4 to about 16 carbon atoms with saturated aliphatic monohydric alcohols containing from 1 to about 10 carbon atoms. Of these diester oils, it is preferable that the alcohol used in their preparation be a branched chain alcohol because the resultant diesters have very valuable lubricating properties and the inhibitor of this invention very effectively stabilizes these materials against oxidative deterioration. Thus, use can be made of oxalates, malonates, succinates, glutarates, adipates, pimelates, suberates, azelates, sebacates, etc.

The diester lubricants used in the lubricant compositions of this invention have the formula:

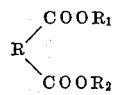

where R is an aliphatic hydrocarbon radical which may be saturated or unsaturated and has from 2 to 14 carbon atoms and $R_1$ and $R_2$ are straight or branched chain alkyl groups. The diesters utilized in the preferred lubricant compositions include esters of succinic, glutaric, adipic, pimelic, suberic, azelaic and sebacic acid. Typical examples of such esters are diisooctyl azelate, di-(2-ethylhexyl) sebacate, di-sec-amyl sebacate, diisooctyl adipate, di-(2-ethylhexyl) adipate, di-(2-ethylhexyl) azelate, di-(1 - methyl-4-ethyloctyl) glutarate, diisoamyl adipate, di-(2-ethylhexyl) glutarate, di-(2 - ethylbutyl) adipate, ditetradecyl sebacate and di - (2 - ethylhexyl) pinate.

The preferred diesters are generally prepared by esterifying one mole of a dicarboxylic acid having the general formula: $HOOC(CH_2)_xCOOH$, where $x$ is an integer of from 2 to 8, with 2 moles of a branched chain alcohol containing at least 4 carbon atoms. Typical are the reactions of succinic, glutaric, adipic, pimelic, suberic or azelaic acid with sec-amyl alcohol, 3-ethyl butanol, 2-ethyl hexanol or the branched chain secondary alcohols undecanol or tetradecanol.

The preferred diester lubricant fluids have molecular weights ranging from about 300 to about 600 and freezing and pour points from about —40° to less than about —100° F. Their flash and fire points range from about 300° F. to about 500° F. and their spontaneous ignition temperatures range from about 100° to about 800° F. The diesters made by reacting a dicarboxylic acid with a branched chain alcohol have been found to have superior viscometric properties as compared with diesters made by reacting dihydric alcohols with mono-carboxylic acids and thus, diesters prepared by the former method are preferred in formulating the lubricant compositions of this invention.

The diester oils may be formed by the reaction of a polycarboxylic acid with a mono-hydric alcohol, the reaction of a polyhydric alcohol with a mono-carboxylic acid, reaction between a polyhydric alcohol with a polycarboxylic acid, or combinations of the above reactions; for example, reaction of a polycarboxylic acid with a glycol and a mono-hydric alcohol, reaction of a glycol with a polycarboxylic acid and a mono-carboxylic acid, or the reaction of a glycol, a mono-hydric alcohol, a polycarboxylic acid and a mono-carboxylic acid. The acids may be mono-carboxylic aliphatic acids such as propionic acid, valeric acid, 2-ethyl enanthic acid, 2,2-dipropyl butyric acid or 3-(2-methylhexyl) valeric acid. They may contain unsaturated linkages as in senecioic acid, sorbic acid, or angelic acid; they may be polycarboxylic aliphatic acids such as succinic acid, glutaric acid, azelaic acid, 5-octene-1,8-dicarboxylic acid, or 3-hexene - 2,3,4-tricarboxylic acid, and they may be aromatic or cycloaliphatic acids, such as cyclohexane acetic acid, 1,4-cyclopentylenebis acetic acid, phthalic acid, hemimellitic acid, and terephthalic acid.

The alcohols used in preparing the polyester lubricant base materials may be aliphatic mono-hydric alcohols such as propanol, 2-ethyl-3-hexanol, 2-ethyl-4-propyl heptanol, 2-butenol, or 2-methyl propanol. They may be polyhydric aliphatic alcohols, such as 1,6-hexamethylene glycol, 1,10-decamethylene glycol, 2-hexene-1,6-diol, and 1,6-heptylene glycol; and they may be mono or polyhydric alicyclic or aromatic alcohols, such as 4-[m-(2-hydroxyethyl)phenyl]butanol, 3-(2-hydroxyethyl) cyclohexanebutanol, p-(hydroxymethyl) phenethyl alcohol, α-methyl-p-xylene-α,α'-diol, 1,4-cyclohexane-α,α'-diethyl-dimethanol, 2,3 - bis - (4 - hydroxybutyl) benzyl alcohol 4,4'-[3-(3 - hydroxyhexyl) - o - phenylene]dibutanol, and 5 - [3 - (3 - hydroxypropyl)cyclopenta - 2,4 - dienylene]-3-ethyl amyl alcohol.

Thus the compounds of this invention very effectively enhance the oxidation resistance of such diester oils as diethyl oxalate; di-sec-butyl malonate; di-(2-hexyl) succinate; di-(isoheptyl) pimelate; di-(3-decyl) suberate;

di-sec-amyl glutarate; di-(isobutyl) glutarate; di-(2-ethylbutyl) glutarate; di-(2-ethylhexyl) glutarate; di-sec-amyl adipate; di-(3-methylbutyl) adipate; diethyl adipate; di-2-ethylhexyl adipate; di-sec-amyl azelate; di-(isobutyl) azelate; di-(2-ethylhexyl) azelate; di-sec-amyl sebacate; di-sec-butyl sebacate; di-(2-ethylhexyl) sebacate; the glutarates, adipates, azelates and sebacates of branched chain secondary alcohols, such as undecanol, tetradecanol, etc., and in general diesters of the type described in the literature and above as useful for synthetic lubricant purposes.

Another class of synthetic lubricants which achieve enhanced oxidative stability by the practice of this invention includes the "silicone" lubricants. The term "silicone" as used herein is defined as a synthetic compound containing silicon and organic groups. In naming specific compounds, the nomenclature system recommended by the American Chemical Society Committee on Nomenclature, Spelling, and Pronunciation (Chem. Eng. News, 24, 1233 (1946) will be used. Thus, the compounds which have the —Si—O—Si-linkages are the siloxanes. Derivatives of silane, $SiH_4$, in which one or more of the hydrogens in silane are replaced with organic groups are termed the silanes. Silicates and silicate ester compounds are named as oxy derivatives of silane and are called alkoxy or aryloxy silanes.

The silicone oils and greases serving as the base medium for the lubricant compositions of the invention include the polysiloxane oils and greases of the type, polyalkyl-, polyaryl-, polyalkoxy-, and polyaryloxy-, such as polydimethyl siloxane, polymethylphenyl siloxane, and polymethoxyphenoxy siloxane. Further included are silicate ester oils, such as tetraalkyloxy and tetraaryloxy silanes of the tetra-2-ethylhexyl and tetra-p-tert-butylphenyl types, and the silanes. Also included are the halogen-substituted siloxanes such as the chlorophenylpolysiloxanes.

The polyalkyl, polyaryl, and polyalkyl polyaryl siloxanes are the preferred types of base medium for the silicon containing lubricant compositions of the invention because of their high oxidative stability over a wide temperature range. The polyalkyl siloxanes, such as the dimethyl polysiloxane, are slightly preferred over the polyaryl and polyalkyl polyaryl siloxanes because they show the least change in viscosity over a wide temperature range.

Certain halogen containing organic compounds have physical properties which render them particularly well suited as lubricants. Ordinarily, the halogen is either chlorine or fluorine. Typical of the chlorinated organic compounds suitable as lubricants are the chlorodiphenyls, chloronaphthalene, chlorodiphenyl oxides and chlorinated paraffin waxes.

The fluorocarbon lubricants which are enhanced by this invention are linear polymers built up of a recurring unit which is

The fluorocarbon oils and greases are very stable chemically and have high thermal stability. These desirable physical properties appear to be closely related to the bond distances occurring in the fluorocarbon polymeric molecule, which may also contain chlorine bonded to carbon.

Polyalkylene glycol lubricants which are benefited by the practice of this invention are ordinarily the reaction product of an aliphatic alcohol with an alkylene oxide. The preferred alkylene oxides are ethylene oxide and propylene oxide. Depending upon the alcohol employed and the molecular weight of the compound, the polyalkylene glycol lubricants may be either water insoluble or water soluble. The molecular weights of these polymers may vary from about 400 to over 3,000. In general, the polyalkylene glycol lubricants are characterized by high viscosity indices, low API gravities, low pour points and they have the general formula:

$$R—(—O—CH_{2n})_xOH$$

where $n$ is small integer and depends upon the alkylene oxide employed and $x$ is a large integer from about 10 to about 100 depending upon the molecular weight of the finished lubricant and R represents the hydrocarbon group derived from the particular aliphatic alcohol employed.

Another important class of synthetic materials which are enhanced by the practice of this invention are phosphate esters which are, in general, prepared by the reaction of an organic alcohol with phosphoric acid and have the general formula:

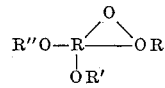

where R, R' and R'' represent either hydrogen or an organic radical and where at least one of the groups represented by R, R' and R'' is an organic radical. Typical of these materials is tricresylphosphate. The phosphate esters are in general characterized by excellent fire resistant properties and high lubricity. However, their thermal stability is such that they are ordinarily unsuited for high temperature applications above about 300° F. Other examples of phosphate esters include: Tris-(2-chloro-1-methylethyl) phosphate; tri-n-butylphosphate; tris-(2-ethylhexyl)phosphate; triphenyl phosphate; tris(p-chlorophenyl)phosphate; diethyl-m-tolyl phosphate; p-chlorophenyl dimethyl phosphate; tris-(2-n-butoxyethyl) phosphate; dimethyl m-tolyl phosphate; di-n-propyl-m-tolyl phosphate; di-n-butyl phenyl phosphate; 1,3-butylene β-chloroisopropyl phosphate; methyl di-m-tolyl phosphate; bis-(2-chloro-1-methylethyl) m-tolyl phosphate; dimethyl 3,5-xylyl phosphate; 4-chloro-m-tolyl dimethyl phosphate; 2-ethyl-1-n-propyltrimethylene methyl phosphate; 4-chloro-m-tolyl 1-methyltrimethylene phosphate; dimethyl n-octyl phosphate, and the like.

The mineral lubricating oils which are greatly benefited by the practice of this invention are those derived from naturally occurring petroleum crude by distillation and various other refining processes well known in the art. These oils include lubricating and industrial oils such as crankcase lubricating oils, transformer oils, turbine oils, transmission fluids, cutting oils, gear oils, industrial oils, mineral white oils, glass annealing oils, oils thickened with soaps and inorganic thickening agents (greases) and in general, engine and industrial oils which are derived from crude petroleum and are normally susceptible to deterioration in the presence of air, particularly at elevated temperatures and most particularly in the presence of metal containing catalysts such as iron, iron oxide, copper and silver.

The greases used in formulating lubricant compositions of the invention are formed by admixing a soap with an oil of any of the types described above. Such soaps are derived from animal or vegetable fats or fatty acids, wool grease, rosin, or petroleum acids. Typical examples are lead oleate, lithium stearate, aluminum tristearate, calcium glycerides, sodium oleate and the like. In addition, the polyester greases may contain unreacted fat, fatty acids and alkali; unsaponifiable matter including glycerol and fatty alcohols; rosin or wool grease; water; and certain additives which may function as modifiers or peptizers.

In formulating the grease compositions of this invention, greases prepared by admixing a lithium soap with the polyester oils are preferred as they have superior oxidative stability as compared with greases formulated with other soaps, such as the sodium, calcium or lead soaps.

In preparing the improved lubricant compositions of this invention, an appropriate quantity of 2,2'-methylenebis-(4-halo-6-tert-butylphenol) is blended with the lubricant to be stabilized. If desired, preformed concentrated solutions of the stabilizer in the base lubricant can be prepared and then subsequently diluted with additional lubricant to the desired concentration. An advantage of this invention is the fact that 2,2'-methylenebis(4-halo-6-tert-butylphenol) is easily and rapidly blended with the base oil and because of the relative low melting point of the stabilizer, there is no danger of separation of the stabilizer from the lubricant under normal use conditions. An additional advantage of this invention is that 2,2'-methylenebis-(4-halo-6-tert-butylphenol) is highly compatible with the usual additives that are frequently used to fortify lubricant compositions such as detergent-dispersants, viscosity index improvers, dyes, anti-rust additives, anti-foaming agents, and the like.

The following examples illustrate various specific embodiments of this invention. The physical characteristics of the illustrative hydrocarbon oils used in the examples are shown in Table I.

TABLE I.—PROPERTIES OF REPRESENTATIVE PETROLEUM HYDROCARBON OILS

| Oil | A | B | C | D | E | F |
|---|---|---|---|---|---|---|
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour Point | −30 | +10 | −20 | −15 | | 0 |
| Flash Point | 410 | 465 | | | 365 | 385 |
| Sulfur, Percent | 0.2 | 0.3 | 0.3 | 0.3 | 0.3 | 0.1 |

*Example 1*

To 100,000 parts of Oil A is added with stirring 12 parts (0.012 percent) of 2,2'-methylenebis(4-chloro-6-tert-butylphenol). The resulting oil is found to possess improved resistance to oxidative deterioration.

*Example 2*

To 100,000 parts of Oil B is added 2,000 parts (2 percent) of 2,2'-methylenebis-(4-bromo-6-tert-butylphenol). On agitating this mixture, a homogeneous solution results and the resulting oil composition possesses enhanced oxidation resistance.

*Example 3*

With 100,000 parts of Oil C is blended 50 parts (0.50 percent) of 2,2'-methylenebis-(4-iodo-6-tert-butylphenol). The resulting oil possesses enhanced resistance against oxidative deterioration.

*Example 4*

To 100,000 parts of Oil D is added 100 parts (0.1 percent) of 2,2'-methylenebis-(4-bromo-6-tert-butylphenol). The resulting oil is found to possess enhanced resistance against oxidative deterioration.

*Example 5*

With 100,000 parts of Oil E is blended 5 parts (0.005 percent) of 2,2' - methylenebis - (4-chloro-6-tert-butylphenol). After mixing the resulting oil possesses enhanced resistance to oxidation.

*Example 6*

To 100,000 parts of Oil F is added 150 parts (0.15 percent) of 2,2'-methylenebis-(4-bromo-6-tert-butylphenol). The resulting oil possesses enhanced resistance against oxidative deterioration.

*Example 7*

With 100,000 parts of di-(sec-amyl) sebacate having a viscosity at 210° F. of 33.8 Saybolt Universal seconds (SUS), a viscosity index of 133 and a molecular weight of 342.5 is blended 100 parts (0.1 percent) of 2,2'-methylenebis- (4 - chloro - 6-tert-butylphenol. The resulting diester lubricant possesses greatly enhanced resistance against oxidative deterioration.

*Example 8*

To 100,000 parts of di-(2-ethylhexyl) sebacate having a viscosity at 210° F. of 37.3 SUS, a viscosity index of 152 and a molecular weight of 426.7 is added 1 part (0.001 percent) of 2,2'-methylenebis-(4-iodo-6-tert-butylphenol). After mixing, the resultant diester lubricant possesses greatly enhanced oxidation resistance.

*Example 9*

To 100,000 parts of di-(2-ethylhexyl) adipate having a viscosity at 210° F. of 34.2 SUS, a viscosity index of 121 and a molecular weight of 370.6 is added 5,000 parts (5 percent) of 2,2'-methylenebis-(4-chloro-6-tert-butylphenol). After mixing, the resultant diester lubricant possesses outstanding resistance against oxidative deterioration.

*Example 10*

Five parts of 2,2'-methylenebis-(4-chloro-6-tert-butylphenol) are blended with 2,495 parts of diisooctyl azelate having a kinematic viscosity of 3.34 centistokes at −65° F. (ASTM 445–52T), an ASTM slope from −40° F. to 210° F. of 0.693 (ASTM D341–43) and a pour point of −85° F. (ASTM D97–47). Its flash points is 425° F. (ASTM D–92–52), and its specific gravity is 0.9123 at 25° C. The resulting lubricant is extremely stable to oxidation.

*Example 11*

Three parts of 2,2'-methylenebis-(4-chloro-6-tert-butylphenol) are blended and mixed with 197 parts of a grease comprising 12.5 percent of lithium stearate, 1 part of polybutene (12,000 molecular weight), 2 percent of calcium xylyl stearate and 84.5 percent of di-(2-ethylhexyl) sebacate, to prepare an improved grease of this invention.

*Example 12*

One part of 2,2'-methylenebis-(4-bromo-6-tert-butylphenol) is blended with 75 parts of diisooctyl adipate having a viscosity of 35.4 SUS at 210° F., a viscosity of 57.3 SUS at 100° F., a viscosity of 3,980 SUS at −40° F. and a viscosity of 22,500 at −65° F. Its viscosity index is 143, its ASTM pour point is below −80° F. and its specific gravity (60° F/60° F.) is 0.926.

*Example 13*

An improved stable grease of this invention is prepared by blending 8 parts of 2,2'-methylenebis-(4-chloro-6-tert-butylphenol) with 920 parts of grease comprising 12 percent of lithium stearate, 1 percent of polybutene (12,000 molecular weight), 2 percent of calcium xylyl stearate, 34.0 percent of di-(2-ethylhexyl) sebacate and 51 percent of di-(2-ethylhexyl) adipate.

*Example 14*

Ten parts of 2,2'-methylenebis-(4-chloro-6-tert-butylphenol) are mixed with 10,000 parts of a grease comprising 11 percent of lithium stearate, 1 percent of polybutene (12,000 molecular weight), 1 percent of sorbitan monooleate, 86.6 percent of di-[1-(2-methylpropyl)-4-ethyloctyl] sebacate.

*Example 15*

Two parts of 2,2'-methylenebis-(4-iodo-6-tert-butylphenol) are blended with 100 parts of a polymethylpolyphenyl siloxane grease of medium weight consistency having a penetration of 240–280 (ASTM–217–48), a minimum melting point of 400° F. and a serviceable temperature range of from −30 to 400° F.

*Example 16*

To a siloxane fluid having a viscosity of 71 centistokes at 25° C. and 24 centistokes at 75° C., a specific gravity of 1.03 at 25° C., a freezing point of −70° C. and a flash point of 540° F., which is composed of a halogen substituted polyphenylpolymethyl siloxane is added sufficient 2,2′-methylenebis-(4-chloro-6-tert-butylphenol) to give a composition containing 1.5 percent of the additive. This oil has an extremely high degree of resistance against oxidative deterioration due to the presence of the 2,2′-methylenebis-(4-chloro-6-tert-butylphenol).

Example 17

To a phenylmethyl polysiloxane fluid having a viscosity of 100–150 centistokes at 25° C., an open cup flash point of 575° F. (ASTM–D–92–33), a freezing point of −60° F., and a specific gravity of 1.07 at 77° F. is added sufficient 2,2′-methylenebis(4-chloro-6-tert-butylphenol) to give a composition containing 0.1 percent of the additive.

Example 18

Ten parts of 2,2′-methylenebis-(4-bromo-6-tert-butylphenol) are blended with about 1,000 parts of monoethyl diethoxy monoacetoxy silane (boiling point 191.5° C.) to prepare an enhanced oil of this invention.

Example 19

A one percent solution of 2,2′-methylenebis-(4-chloro-6-tert-butylphenyl) in tribenzyl-n-hexadecyl silane (boiling point 245–248° C.) constitutes an improved lubricant within the scope of this invention.

Example 20

To a poly(trifluorochloroethylene) having the formula $(CF_2CFCl)_x$ and an average molecular weight of 880, pour point of 5° C. and a viscosity of 45 centistokes at 160° F. is added 1.25 percent of 2,2′-methylenebis-(4-iodo-6-tert-butylphenol) to prepare an improved lubricant of this invention.

Example 21

A composition consisting of 0.01 percent of 2,2′-methylenebis-(4-chloro-6-tert-butylphenol) is prepared by blending an appropriate quantity of the compound with a fluorocarbon grease having a penetration of 267 millimeters at 77° F., 285 millimeters at 100° F. and 300 millimeters at 125° F. (ASTM–217–48); and a dropping point of at least 400° F. (ASTM–D–566–42).

Example 22

To a polyalkylene glycol oil lubricant having a viscosity index of 148, ASTM pour point of −55° F., a flash point of 300° F., a specific gravity of 0.979 and a Saybolt viscosity of 135 at 100° F. is added 1 percent of 2,2′ - methylenebis-(4-chloro-6-tert-butylphenol) to prepare an extremely oxidative resistant polyalkylene glycol lubricant.

Example 23

A composition containing 0.2 percent of 2,2′-methylenebis-(4-bromo-6-tert-butylphenol) is prepared by adding an appropriate quantity of the compound to a polyalkylene glycol lubricant which is insoluble in water and which has a Saybolt viscosity of 62.7 at 200° F., a viscosity index of 146, ASTM pour point of −40° F., a fire point of 490° F. and a specific gravity of 0.991.

Example 24

An improved lubricant of this invention comprising a chlorinated organic compound is prepared by admixing 0.5 percent of 2,2′-methylenebis-(4-chloro-6-tert-butylphenol) with a chlorodiphenyl oil having a distillation range of from 554 to 617° F., a Saybolt viscosity at 100° F. of about 49, a pour point of −30° F. and a specific gravity of about 1.267.

Example 25

An improved hydraulic fluid and lubricant according to this invention is prepared by adding 2 percent of 2,2′-methylenebis-(4-chloro - 6 - tert-butylphenol) to tricresyl phosphate.

Example 26

To illustrate the advantages achieved by the practice of this invention, particularly when the compositions are subjected to elevated temperature, runs were conducted using the Panel Coker Test. This test measures the oxidative stability of oils which are maintained at elevated temperatures in the presence of air, the oils periodically coming in contact with a hot metal surface. This test is described in the Aeronautical Standards of the Departments of Navy and Air Force, Spec. MIL–L–7808C, dated November 2, 1955. In these experiments, the diester lubricant was a commercially available di-(2-ethylhexyl) sebacate which was devoid of additives. The test was modified so that the Panel Coker apparatus was operated at 600° F. for 10 hours on a cycling schedule—the splasher being in operation for 5 seconds followed by a quiescent period of 55 seconds. On completion of these tests the extent by which the various test oils were decomposed under these high temperature oxidizing conditions was determined by weighing the amount of deposits which formed on the metallic panel. Under these test conditions, the use of the additive free di-(2-ethylhexyl)sebacate caused the formation of 138 milligrams of deposits on the metallic panel. However, the presence of only 0.5 percent by weight of 2,2′-methylenebis-(4-chloro-6-tert-butylphenol) caused a substantial reduction in panel deposit.

Example 27

To further demonstrate the benefits resulting from the practice of this invention, additional Panel Coker tests were carried out using petroleum hydrocarbon lubricating oil. The test conditions were identical with those above except that the temperature of the lubricants was maintained at 550° F. The base oil used was an initially additive-free solvent-refined commercial neutral mineral lubricating oil having a viscosity at 100° F. of 200 SUS and a viscosity index of 95. It was found that the additive free oil formed 434 milligrams of deposit on the panel when subjected to the foregoing test conditions. However, when the oil had been treated with one percent by weight of 2,2′-methylenebis-(4-chloro-6-tert-butylphenol), there were only 82 milligrams of deposit on the panel.

Example 28

To further illustrate the effectiveness of the 2,2′-methylenebis-(4-halo-6-tert-butylphenol) compounds as lubricant additives, tests were conducted on a highly refined mineral derived oil having a viscosity index of 106.5 and a viscosity of 87.1 SUS at 100° F. The oil was charged in separate samples (with and without an additive of this invention) to an apparatus for measuring the oxidative stability of the oil. The apparatus consists of a glass vessel having a 12 milliliter capacity and an inlet tube which can be connected to a mercury manometer. After the oil is charged, the vessel is flushed with oxygen at atmospheric pressure and then connected to the mercury manometer. The vessel is then immersed in a constant temperature bath at 150° C. whereupon changes in the oxygen pressure are indicated on the manometer. The manometer is observed until a rapid pressure drop in the vessel occurs. The time from immersion to the initiation of the pressure drop is the induction period of the oil. To all samples, ferric hexoate is added to catalyze oxidation and make the test more severe. The concentration of the iron salt is adjusted to 0.05 percent based on $Fe_2O_3$. One milliliter of the oil is charged to the apparatus in each test. In tests of this nature the base oil has an induction period of from 2 to 3 minutes, showing that it is completely unstable to oxidative deterioration at 150° C. However, when the oil contained $1.0 \times 10^{-2}$ moles per liter of 2,2′-methylenebis-(4-chloro-6-tert-butylphenol), the induction time was 349 minutes. Thus the stability of the oil was raised by the enormous factor of about 115–175 times its original value.

*Example 29*

Another illustration of the improvements in oil stability achieved by the practice of this invention are shown by Polyveriform Oxidation Stability Tests, described in the paper entitled "Factors Causing Lubricating Oil Deterioration in Engines" (Industrial and Engineering Chemistry, Analytical edition, 17, 302, (1945)). See also "A Bearing Corrosion Test for Lubricating Oils and Its Correlation with Engine Performance" (Analytical Chemistry, 21, 737, (1949)). This test effectively evaluates the performance of lubricating oil antioxidants. The test equipment and procedure employed and correlations of the results with engine performance are discussed in the first paper above mentioned.

The amount of oxidation taking place during the test is measured in terms of acid number and viscosity increase of the oil. By contrasting a composition of this invention with a similar oil not containing an additive of this invention, the outstanding benefits are illustrated. For example, in a set of tests conducted as described in the first reference cited above, modified to the extent that the steel and copper test piece described in the publication were omitted, a non-additive lubricating oil was compared with the same oil containing 1.0 weight percent of the preferred compound of this invention, 2,2'-methylenebis-(4-chloro-6-tert-butylphenol). In order to make the test as severe as possible 70 liters of air per hour were passed through the oil for a period of 20 hours while the oil temperature was maintained at 300° F. The non-additive oil had an acid number of 6.0 after completion of the test and its viscosity had increased by 103 percent. In distinction to this the sample of oil containing 1.0 weight percent of 2,2'-methylenebis-(4-chloro-6-tert-butylphenol) had an acid number of only 1.6 and had suffered only a 23 percent increase in viscosity during the test. In addition to this, essentially no sludge had formed in the oil of this invention.

*Example 30*

To still further illustrate the benefits derived from this invention tests were conducted on an electromotive diesel oil having a viscosity index of 54 and a viscosity of 919 Saybolt Universal seconds at 100° F. In this test the oil is heated at 325° F. with agitation for 120 hours. Two metal catalysts are employed to promote degradation of the oil, namely, a silver plated wrist pin bushing specimen and a copper metal catalyst specimen. Degradation of the oil is determined by acid number after the test and percent viscosity increase at 100° F. In addition the condition of the silver specimen indicates poor performance in the oil. One sample of the oil employed in this test contained a commercially available zinc dithiosulfate in amount equivalent to 0.02 weight percent phosphorus. In this test the acid number of the oil increased to 2.6 and there was a 47 percent increase in the viscosity. However, when an oil containing 4 percent of a barium sulfonate and 0.05 percent by weight of 2,2'-methylenebis-(4-chloro-6-tert-butylphenol) was subjected to the test, the final acid number was only 0.5 and the viscosity had increased only 31 percent. In addition the silver test specimen came through the test essentially unchanged.

In the lubricant compositions of this invention effective use can be made of other additives which are known to the art, such as other inhibitors, detergent-dispersants, pour point depressants, viscosity index improvers, anti-foam agents, rust inhibitors, oiliness or film strength agents, dyes and the like. Of the inhibitors which can be effectively used in combination with the additives of this invention are sulfurized sperm oil, sulfurized terpenes, sulfurized paraffin wax olefins, aromatic sulfides, alkyl phenol sulfides, lecithin, neutralized dithiophosphates, phosphorous pentasulfide-terpene reaction products, diphenylamine, phenylnaphthyl amine, β-naphthol, pyrogallol, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, alkaline earth metal alkyl phenol sulfides (barium amyl phenol sulfide, calcium octyl phenol disulfide, etc.), metal salts of wax-substituted phenol derivatives and the like. Of the viscosity index improvers and pour point depressants, effective use can be made of polymers of the esters of methacrylic acids and higher fatty alcohols and the corresponding polymers of esters of acrylic acid and higher fatty alcohols. These and other additives which can be employed in the compositions of this invention will now be well known to those skilled in the art.

The compounds of this invention are particularly effective antioxidants for use in steam turbine oils. This is demonstrated by making use of the standard test procedure of the American Society for Testing Materials bearing ASTM designation D–943–54. According to this test procedure, 300 ml. of a suitable test oil is placed in contact with 60 ml. of water and the resulting oil-water system is maintained at a temperature of 95° C. while passing oxygen therethrough at a rate of three liters per hour. Oxidation is catalyzed by the use of iron and copper wire. Periodically measurements are made of the acid number of the test oil and failure of an antioxidant is indicated by an acid number in excess of 2.0. It is found that when the various compositions of this invention are added in small antioxidant quantities to steam turbine oils, substantial resistance against oxidative deterioration results.

The compounds of this invention are very effective antioxidants for grease. The potency of the compounds of this invention in this respect is demonstrated by conducting the Norma Hoffman Grease Oxidation Stability Test, ASTM Test Procedure D–942–50. It is found that the presence of minor proportions of the compounds of this invention in conventional greases greatly inhibits oxidative deterioration. By way of example an initially antioxidant-free lithium base grease is modified to the extent that it contains 0.5 percent by weight of the product of Example 13, and is subjected to the above oxidation stability test. It is found that the presence of the composition produced by the process of this invention greatly retards oxygen absorption by the grease.

The stabilizers of this invention are also excellent additives to tetraalkyllead antiknock compositions. The tetraalkyllead antiknock agents which are stabilized according to this invention are represented by such compounds as tetramethyllead, tetraethyllead, tetrapropyllead, dimethyldiethyllead, trimethylethyllead, and the like, or mixtures thereof. Such compounds containing from 4 to about 12 carbon atoms, one atom of lead and a plurality of lead-to-carbon bonds, are capable of increasing the octane quality of gasoline when employed therein in antiknock quantities—0.5 to 6.5 grams of lead per gallon. Halogen-containing compounds such as triethyllead bromide may also be stabilized according to this invention.

The scavengers which are preferably, but not necessarily, present in the antiknock compositions of this invention are organic halide compounds which react with the lead during combustion in the engine to form volatile lead halide. The halogen of these scavengers has an atomic weight between 35 and 80; that is, the active scavenging ingredient is chlorine and/or bromine. Such scavengers include carbon tetrachloride, propylene dibromide, 2-chloro-2,3-dibromobutane, 1,2,3-tribromopropane, hexachloropropylene, mixed bromoxylenes, 1,4-dibromobutane, 1,4-dichloropentane, β,β'-dibromodiisopropyl ether, β,β'-dichlorodiethyl ether, trichlorobenzene, dibromotoluenes, and in general those disclosed in U.S.

Patents 1,592,954; 1,668,022; 2,364,921; 2,479,900; 2,479,901; 2,479,902; 2,479,903; and 2,496,983. In short, we prefer to employ scavengers containing only elements selected from the group consisting of carbon, hydrogen, bromine, chlorine and oxygen. The amount of scavenger used is from about 0.5 to about 2.0 theories, a theory being defined as the quantity required to react with the lead to form lead halide—i.e. 2 atoms of halogen per atom of lead. When we use mixtures of bromine-containing and chlorine-containing scavengers, particularly bromo and chlorohydrocarbons, we can employ concentrations and proportions as described in U.S. Patent 2,398,281. Such concentrations are sufficient to control the amount of deposits formed in the engine.

The tetraalkyllead antiknock compositions of this invention may contain other ingredients such as dyes for identification purposes, metal deactivators, diluents and the like.

Antiknock compositions containing tetraalkyllead antiknock agents are employed by adding them to gasoline to improve the antiknock quality thereof. Such gasolines both before and after addition of the antiknock fluid are benefited by the practice of this invention. Thus gasolines to which have been added a compound of this invention are found to be more stable upon prolonged periods of storage.

The following examples illustrated gasoline embodiments of this invention.

*Example 31*

To 10,000 parts of a grade 115/145 aviation gasoline containing 4.5 ml. of tetraethyllead per gallon which has an initial boiling point of 110° F. and a final boiling point of 330° F. and an API gravity of 71.0° is added 0.5 percent of 2,2'-methylene-bis-(4-chloro-6-tert-butylphenol).

*Example 32*

To a gasoline containing 26.6 percent aromatics, 20.8 percent olefins and 52.6 percent saturates and which has an API gravity of 62.1° is added 0.1 percent of 2,2'-mehylenebis-(4-bromo-6-tert-butylphenol).

Similarly, the compounds of this invention may be added with benefit to gasoline of whatever nature and however processed.

As noted above the compounds of this invention are also extremely useful in inhibiting and stabilizing non-petroleum fats and oils normally subject to the deteriorating effect of oxidative rancidity. In particular, compounds of this invention are excellent stabilizers for animal fats and oils, especially lard, against the effects of rancidity. The compounds of this invention may be used in concentrations from 0.001 to about 0.1 weight percent in this embodiment of the invention. In addition, an acid synergist may be employed to promote the activity of the additives of this invention. These synergists which mutually cooperate with the compounds of this invention, particularly 2,2'-methylenebis-(4-chloro-6-tert-butylphenol) to produce a disproportionately large increase in effectiveness in stabilizing fatty materials including citric acid, phosphoric acid, ascorbic acid, ethyl acid phosphate, glucuronolactone phytic acid, tartaric acid and aconitic acid.

In formulating the stabilized non-petroleum fats and oils of this invention, the additive or combination of additives is incorporated by appropriate means into the substrate to be stabilized. Thus, in the case of animal, vegetable and fish oils, the additive or combination of additives is added in appropriate quantity and the resulting mixture agitated to insure homogeneity. Where the substrate is a solid at room temperatures—e.g., fats, butter, etc.—the mixing is preferably carried out at temperatures above the melting point of the substrate. When a combination of additives is used, they can be mixed with the substrate as a preformed mixture or can be separately blended therewith in either order. Generally speaking, it is desirable to first dissolve the additive or additive combination in high concentration in a small portion of the material to be stabilized. The resulting concentrated solution is then blended with the remaining bulk. Another way of facilitating the formulation of the composition of this invention is to pre-dissolve the additive or combination of additives in a suitable solvent, such as ethanol, glycerol, propylene glycol, etc. and then mix the resultant solution with the material to be stabilized. However, the preferred way of formulating the compositions of this invention is to pre-dissolve the additive or additive mixture in a fatty acid partial ester of a polyhydroxy compound, notably a monoglyceride, and then blend this mixture with the material to be stabilized. The nature of these monoglyceride compositions is well known in the art and may be made from either animal or vegetable fats, with or without previous hydrogenation. These compositions generally contain about 40 percent of the monostearyl, monoolearyl, and/or monopalmityl glycerides or mixtures thereof with the balance comprising a mixture of di- and tri-glycerides. Molecularly distilled monoglycerides may also be used for this purpose. These compositions will be apparent from the following examples.

*Example 33*

With 1,000 parts of melted lard is mixed 1 part (0.1 percent) of 2,2'-methylenebis - (4 - chloro - 6 - tert - butylphenol). After cooling the lard can be stored for long periods of time without the development of rancidity.

*Example 34*

With 5,000 parts of cottonseed shortening is blended 0.05 part (0.001 percent) of 2,2'-methylenebis-(4-bromo-6-tert-butylphenol). The resulting shortening has improved resistance against oxidative rancidity.

*Example 35*

In 2.5 parts of propylene glycol is dissolved with stirring 1 part of 2,2'-methylenebis-(4-iodo-6-tert-butylphenol). The resulting mixture is then added with stirring to 10,000 parts of cod liver oil. The resultant oil containing 0.01 percent of the additive possesses increased resistance against oxidative deterioration.

*Example 36*

To 10,000 parts of corn oil are added with stirring 5 parts (0.05 percent) of 2,2'-methylenebis-(4-chloro-6-tert-butylphenol) and 2 parts (0.02 percent) of ascorbic acid. The resulting corn oil has improved storage stability characteristics.

*Example 37*

To 100 parts of monoglyceride (prepared from a partially hydrogenated vegetable oil) heated to 180° F. is added with stirring 5 parts of 2,2'-methylenebis-(4-bromo-6-tert-butylphenol) and 4 parts of citric acid. Ten parts of the resultant monoglyceride formulation are added with stirring to 10,000 parts of melted prime steam lard. The lard composition so formed which contains 0.005 percent of 2,2'-methylenebis-(4-chloro-6-tert-butylphenol) and 0.004 percent of citric acid can be stored at room temperature for long periods of time without developing rancidity.

Hydrocarbon polymers which are stabilized against oxidative deterioration according to this invention include natural rubber, GR–S and GR–N rubbers, butyl rubber, methyl rubber, polybutene rubber, butadiene rubbers, piperylene rubbers, dimethylbutadiene rubbers, polystyrene, polybutadiene, polyisobutylene, polyethylene, isobutylene-styrene copolymer and, in general, elastomeric hydrocarbon polymers which are normally susceptible to oxidative deterioration. Such polymers are well known in the art and besides being susceptible of oxidative deterioration are characterized by having molecular weights above about 10,000. The problem resulting from heat, light and catalyst promoted oxidative deterioration in such hydrocarbon polymers is intensified because of free radical formation within the polymers. This leads to various forms of physical and chemical degradation such as chain scission, autocatalytic oxidation, reduction in molecular weight and loss of original physical properties. The net result is that the desirable, useful and necessary properties of the polymers which are associated with their original chemical structure and molecular weights are lost to a greater or lesser extent unless the polymers are stabilized against such deterioration.

*Example 38*

To a synthetic rubber master batch comprising 100 parts of GR–S rubber having an average molecular weight of 60,000, 5 parts of mixed zinc propionate-stearate, 50 parts of carbon black, 5 parts of road tar, 2 parts of sulfur and 1.5 parts of mercaptobenzothiazole is incorporated 1.5 parts of 2,2'-methylenebis-(4-chloro-6-tert-butylphenol). This batch is then cured for 60 minutes at 45 pounds per square inch of steam pressure.

*Example 39*

One percent of 2,2'-methylenebis-(4-chloro-6-tert-butylphenol) is added to a synthetic rubber master batch comprising 100 parts of GR–S rubber having an average molecular weight of 100,000, 5 parts of zinc stearate, 50 parts of carbon black, 5 parts of road tar, 2 parts of sulfur and 1.5 parts of mercaptobenzothiazole. This batch is then cured as described in Example 38.

*Example 40*

Two parts of 2,2'-methylenebis-(4-bromo-6-tert-butylphenol) is incorporated in 100 parts of raw butyl rubber prepared by the copolymerization of 90 percent of isobutylene and 10 percent of isoprene and having an average molecular weight of 100,000.

*Example 41*

To 200 parts of raw butyl rubber having an average molecular weight of 600,000 and prepared by copolymerizing 95 percent of isobutylene and 5 percent of butadiene is added 1.5 parts of 2,2'-methylenebis-(4-chloro-6-tert-butylphenol).

*Example 42*

To a master batch of GR–N synthetic rubber comprising 100 parts of GR–N rubber having an average molecular weight of 75,000, 5 parts of zinc stearate, 50 parts of carbon black, 5 parts of road tar, 2 parts of sulfur and 2 parts of mercaptobenzothiazole is added 5 percent based on the weight of the batch of 2,2'-methylenebis-(4-chloro-6-tert-butylphenol).

*Example 43*

A dry blend of polystyrene and 2,2'-methylenebis-(4-chloro-6-tert-butylphenol) is prepared by mixing 1 part of this phenol with 100 parts of polystyrene having an average molecular weight of 50,000.

*Example 44*

0.25 percent by weight of 2,2'-methylenebis-(4-chloro-6-tert-butylphenol) is incorporated in polybutadiene having an average molecular weight of 50,000.

*Example 45*

To natural rubber (Hevea) is added 0.02 percent of 2,2'-methylenebis-(4-iodo-6-tert-butylphenol).

The above examples illustrate the improved compositions of this invention. Other such compositions and the methods of preparing the same will now be apparent to the person skilled in the art.

*Example 46*

To illustrate the enhanced oxygen resistance of the hydrocarbon polymer compositions of this invention, a natural rubber compounded into a typical tire-tread formula is selected for test. One requisite of such stocks is that the desirable properties incorporated therein by careful selection of the compounding ingredients and cure time shall be maintained during extended periods of storage and use in the presence of oxygen. Comparison of various rubber stocks is best carried out on stocks initially having the same state of cure. The most reliable means for determining the state of cure is by the T–50 test, ASTM designation: D–599–40T, described in the ASTM Standards for 1952, Part 6. This test measures the temperature at which a test piece recovers its elasticity when it is stretched at room temperature, frozen at a sufficiently low temperature to cause it to lose its elastic properties, and then gradually warmed. In practice the temperature noted is that at which the sample recovers to 50 percent of the original elongation and is, therefore, referred to as the T–50 value. Stocks for testing and comparison are cured for a time sufficient to have a T–50 value of —4.5° C. so that a valid comparison of the properties can be made. The accelerated aging is conducted by the procedure of ASTM designation: D–572–52, described in the ASTM Standards for 1952, Part 6, for a period of 96 hours at a temperature of 70° C., with an initial oxygen pressure in the test bomb of 300 pounds per square inch gauge on specimens having the following composition:

| | Parts by weight |
|---|---|
| Smoked sheets | 100.00 |
| Carbon black | 45.00 |
| Zinc oxide | 5.00 |
| Stearic acid | 3.00 |
| Pine tar oil | 2.00 |
| Sulfur | 3.00 |
| Mercaptobenzothiazole | 0.65 |
| | 158.65 |

To demonstrate the protection afforded to the rubber by the inhibitors of this invention, the tensile strength and the ultimate elongation of stocks prepared by the addition of an inhibitor of our invention are determined before and after aging. These properties are compared with the same properties determined on an identical rubber stock not protected by an inhibitor. Both of these properties are determined by means of the test procedure of ASTM designation: D–412–51T, fully described in ASTM Standards for 1952, Part 6. The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

The novel 2,2'-methylenebis-(4-halo-6-tert-butylphenol) compounds of this invention are prepared by a process which comprises reacting a 4-halo-6-alkylphenol having the formula:

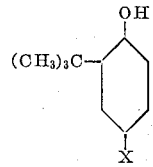

where X is a halogen such as chlorine, bromine and iodine with formaldehyde in the presence of an alkali metal hydroxide and a non-aqueous solvent. This reaction is illustrated by the following examples:

*Example 47*

In a reaction vessel equipped with reflux condenser, heating means, means for agitating reactants and means for charging liquid reactants was placed 3142 parts of isopropanol and 66 parts of potassium hydroxide. The mixture was agitated until the potassium hydroxide was completely dissolved at which point 1846 parts of 4-chloro-6-tert-butylphenol was added and the mixture was heated to 45° C. While maintaining the temperature, 420 parts of a 36.3 percent formalin solution was added incrementally. The reaction temperature was thereafter maintained with agitation for 6 hours, cooled to room temperature and acidified with about 200 parts of dilute hydrochloric acid. The acidified mixture was added to about 5500 parts of petroleum ether, the isoproanol was extracted with water and the water phase discarded. The organic phase was then distilled through a helix packed column and 665 parts of 2,2'-methylenebis-(4-chloro-6-tert-butylphenol) were recovered at 209–213° C. at 0.3 ml. pressure. A portion of this material was recrystallized from petroleum ether to yield white crystals of pure 2,2'-methylenebis-(4-chloro-6-tert-butylphenol) having a melting point of 114–114.5° C. Upon analysis these crystals were found to contain 64 percent carbon, 6,6 percent hydrogen and 19.6 percent chlorine. The calculated content for the compound is 66.1 percent carbon, 6.8 percent hydrogen and 18.6 percent chlorine. An infrared spectrum of the compound showed bands of a partially hindered hydroxyl of a bisphenol compound. The ring substitution as determined from the infrared spectrum showed the compound to contain a 1,2,4,6-substituted benzene ring.

*Example 48*

Using isopropanol as a solvent 2-tert-butyl-4-chlorophenol was reacted with 37 percent aqueous formaldehyde in the presence of potassium hydroxide as a catalyst for 17 hours at reflux temperature. The following procedure was used: 19 parts of the potassium hydroxide contained in about 100 parts of isopropanol was added to the reaction vessel which was then flushed with nitrogen, 61 parts of 2-tert-butyl-4-chlorophenol and about 7 parts of formaldehyde as a 37 percent aqueous solution were simultaneously added. After the addition of the formaldehyde the reaction mixture was refluxed. After the reaction the mixture was taken up in n-hexane, washed well with water, dried and stripped under reduced pressure to remove the isopropanol solvent. The product of this work-up procedure was a viscous oil which was fractionally distilled to yield 26 percent of the starting phenol, 5 percent of 6-tert-butyl-4-chloro-2-hydroxymethylphenol (boiling point 125–127° C. at 0.5 mm. of mercury pressure) and 11 percent of 2,2'-methylenebis-(4 - chloro - 6 - tert-butylphenol), which boiled at 180–220° C. at the reduced presure of 0.5 mm. and which had a melting point of 109–110° C. The structure of the compound was confirmed by infrared analysis.

*Example 49*

Following the procedure of Example 47, an appropriate quantity of 2-tert-butyl-4-bromophenol is reacted with formaldehyde in the presence of sodium hydroxide and ethanol to produce 2,2'-methylenebis-(4 - bromo - 6-tert-butylphenol).

Similarly, 2,2'-methylenebis-(4-iodo - 6 - tert-butylphenol) may be prepared by employing 2-tert-butyl-4-iodophenol as the starting material.

In the above reaction a lower aliphatic alcohol is employed as a solvent. The preferred solvents are ethanol and isopropanol. The reaction is conducted at temperatures varying from 20 to about 90° C. and may be continued for from one-half to about 40 hours, depending upon the temperature conditions employed.

The product 2,2'-methylenebis-(4-halo-6-tert-butylphenol) is preferably recovered from the reaction mixture by first stripping the solvent and then distilling the reaction residue at reduced pressures. The reduced pressure employed should be adjusted so that the desired product distills at temperatures in the range of from 100 to 250° C. and preferably in the range of 130 to about 220° C.

We claim:
1. Organic material normally tending to undergo oxidative deterioration protected against such deterioration by the inclusion therein of a small antioxidant quantity, up to 5 percent, of a compound having the formula:

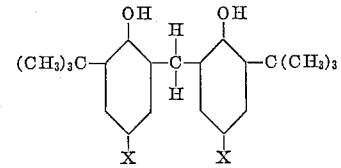

wherein X is a halogen selected from the class consisting of chlorine, bromine and iodine.

2. The composition of claim 1 wherein said compound is 2,2'-methylenebis(4-chloro-6-tert-butylphenol).

3. Petroleum-derived hydrocarbon compositions containing a small stabilizing quantity, up to 5 percent, of a compound having the formula:

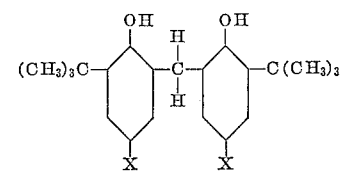

wherein X is a halogen selected from the class consisting of chlorine, bromine and iodine.

4. Hydrocarbon mineral lubricating oil containing as an antioxidant therefor up to 5 percent of 2,2'-methylenebis(4-chloro-6-tert-butylphenol).

5. Gasoline containing as an antioxidant up to 5 percent of the compound 2,2'-methylenebis(4-chloro-6-tert-butylphenol).

6. A solid hydrocarbon polymer normally susceptible to oxidative deterioration containing, in amount sufficient to inhibit such deterioration, a small antioxidant quantity of 2,2'-methylenebis(4-chloro-6-tert-butylphenol).

7. Sulfur vulcanized elastomeric material selected from the class consisting of natural and synthetic rubber, containing as an antioxidant from 0.001 to about 5 percent of a compound having the formula:

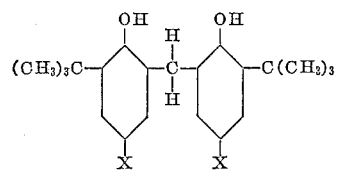

wherein X is a halogen selected from the class consisting of chlorine, bromine and iodine.

8. Polyethylene containing a small antioxidant quantity of 2,2'-methylenebis(4-chloro-6-tert-butylphenol).

9. Sulfur-vulcanized natural rubber containing as an antioxidant from 0.001 to about 5 percent of 2,2'-methylenebis(4-chloro-6-tert-butylphenol).

10. Sulfur-vulcanized synthetic rubber containing as an antioxidant from 0.001 to about 5 percent of 2,2'-methylenebis(4-chloro-6-tert-butylphenol).

References Cited by the Examiner

UNITED STATES PATENTS

| | | | |
|---|---|---|---|
| 2,542,972 | 2/1951 | Thompson | 44—78 X |
| 2,671,813 | 3/1954 | Stoffel | 260—619 |
| 2,734,088 | 2/1956 | Knowles et al. | 252—52 X |
| 2,829,175 | 4/1958 | Bowman et al. | 252—52 X |
| 2,999,842 | 9/1961 | Csendes | 252—404 X |
| 3,012,049 | 12/1961 | Bill | 260—619 X |

DANIEL E. WYMAN, *Primary Examiner.*

J. E. DEMPSEY, Y. M. HARRIS, *Assistant Examiners.*